No. 754,768. Patented March 15, 1904.

UNITED STATES PATENT OFFICE.

EDUARD HEPP, OF FRANKFORT-ON-THE-MAIN, AND ERNST WOLPERT, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

PROCESS OF MAKING ANTHRAQUINONE DYES.

SPECIFICATION forming part of Letters Patent No. 754,768, dated March 15, 1904.

Application filed October 15, 1903. Serial No. 177,176. (No specimens.)

*To all whom it may concern:*

Be it known that we, EDUARD HEPP, Ph. D., residing at Frankfort-on-the-Main, and ERNST WOLPERT, Ph. D., residing at Höchst-on-the-Main, Germany, both citizens of the Empire of Germany, have invented certain new and useful Improvements in the Process of Making new Anthraquinone Dyestuffs, of which the following is a specification.

It is known by Letters Patent No. 734,325 that by heating 1:4:5:8 leucotetraoxyanthraquinone with primary aromatic amins in presence of salts thereof dialphylidodioxyanthraquinones are obtained, which in their sulfonated form dye chrome mordanted or unmordanted wool fast green shades.

Our new process consists in the production of very valuable blue coloring-matters from said leucotetraoxyanthraquinone by condensing it with the sulfo-acids of primary aromatic amins.

In carrying out this process it is necessary to employ the sulfo-acids—(such as sulfanilic acid, metanilic acid, para-toluidin-sulfo-acid, $[CH_3:NH_2:SO_3H = 1:4:6,]$ para-amidobenzyl-sulfo-acid and so on)—in the form of their salts or together with suitable acetates, such as the acetates of alkalies. The sulfo-acids are thus heated with the leucotetraoxyanthraquinone in presence of a condensing agent, such as boric acid, and of a suitable solvent—such as water, acetic acid, glycerin, acetin, and so on—and after the condensation having taken place the melts are diluted with water and the dyestuffs are precipitated from their aqueous solutions with common salt or in another suitable manner. The dyestuffs thus obtained are when dry dark-blue powders, soluble in water and ammonia with a blue color. They dye chrome mordanted and unmordanted wool very fast blue shades.

The following example will serve to further illustrate the manner in which our invention can be carried out. The parts are by weight: Ten parts of 1:4:5:8 leucotetraoxyanthraquinone are mixed with ten parts of crystallized boric acid, thirty parts of sulfanilate of sodium, ten parts of sodium acetate, and seventy parts of dilute acetic acid of fifty-per-cent. strength, and the mixture is heated for some hours on a water-bath until no further increase in the quantity of the coloring-matter produced is observed. The melt is then poured into water, the aqueous solution is heated to boiling, filtered, and the dyestuff is precipitated with common salt. It is filtered off, pressed, and dried.

Instead of 1.4.5.8 leucotetraoxyanthraquinone the corresponding tetraoxyanthraquinone may be employed in this process, together with a suitable reducing agent, such as stannous chlorid and sodium acetate, the leucotetraoxyanthraquinone reacting then in the nascent state.

When pulverized, our new product is a dark-blue powder which is soluble in water and ammonia with a blue color and is completely separated by adding to the aqueous solution an excess of mineral acids. It is soluble in concentrated sulfuric acid, yielding a blue solution. By heating with dilute caustic alkalies and zinc-dust it gives an orange solution, which when filtered assumes the initial blue color on exposure to the air. It dyes chrome mordanted and unmordanted wool blue shades distinguished by their fastness to light, acids, and alkalies.

Having now described our invention and the manner of performing same, what we claim is—

1. The herein-described process of making new anthraquinone dyestuffs, which consists in treating 1.4.5.8 leucotetraoxyanthraquinone with the sulfo-acids of primary aromatic amins and then isolating the resulting dyestuff sulfonic acids from the mixture of reaction in the manner hereinbefore described, substantially as set forth.

2. The herein-described process of making a new anthraquinone dyestuff, which consists in treating 1.4.5.8 leucotetraoxyanthraquinone with sulfanilic acid and then isolating the resulting dyestuff sulfonic acid from the mixture of reaction in the manner hereinbefore described, substantially as set forth.

3. The herein-described new dyestuff sulfonic acids, obtainable by condensing 1.4.5.8 leucotetraoxyanthraquinone with the sulfoacids of primary aromatic amins, which dyestuffs, when dry and pulverized, are dark powders, soluble in water and ammonia with a blue color, dyeing mordanted or unmordanted wool fast blue shades.

4. The herein-described dyestuff sulfonic acid obtainable by condensing 1.4.5.8 leucotetraoxyanthraquinone with sulfanilic acid, being when dry and pulverized a dark-blue powder soluble in water and ammonia with a blue color and which is separated by adding to the aqueous solution an excess of mineral acids, soluble in concentrated sulfuric acid yielding a blue solution, giving when heated with dilute caustic alkalies and zinc-dust an orange solution which when filtered assumes the initial blue color on being exposed to the air, dyeing mordanted or unmordanted wool blue shades distinguished by their fastness to light, acids and alkalies.

In testimony that we claim the foregoing as our invention we have signed our names in presence of two subscribing witnesses.

EDUARD HEPP.
ERNST WOLPERT.

Witnesses:
JEAN GRUND,
CARL GRUND.